United States Patent
Kosaka

(10) Patent No.: US 8,531,545 B2
(45) Date of Patent: Sep. 10, 2013

(54) IMAGE PROCESSING APPARATUS, INCLUDING A FILTER ACQUISITION PART, AND IMAGE PICKUP APPARATUS

(75) Inventor: Yuichi Kosaka, Utsunomiya (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 13/074,590

(22) Filed: Mar. 29, 2011

(65) Prior Publication Data

US 2011/0242372 A1   Oct. 6, 2011

(30) Foreign Application Priority Data

Mar. 31, 2010   (JP) .................................. 2010-079989

(51) Int. Cl.
*H04N 5/228* (2006.01)

(52) U.S. Cl.
USPC .......................... 348/222.1; 348/335; 382/254

(58) Field of Classification Search
USPC ....................................... 348/222.1; 382/254
See application file for complete search history.

(56) References Cited

U.S. PATENT DOCUMENTS

| | | | | |
|---|---|---|---|---|
| 5,307,175 A | * | 4/1994 | Seachman | 358/401 |
| 6,154,574 A | * | 11/2000 | Paik et al. | 382/255 |
| 6,363,220 B1 | * | 3/2002 | Ide | 396/98 |
| 6,697,522 B1 | * | 2/2004 | Ishikawa | 382/167 |
| 7,885,489 B2 | * | 2/2011 | Hayashi et al. | 382/312 |
| 8,294,807 B2 | * | 10/2012 | Feng et al. | 348/340 |
| 2003/0184663 A1 | * | 10/2003 | Nakano et al. | 348/241 |
| 2006/0239549 A1 | | 10/2006 | Kelly | |
| 2009/0141140 A1 | * | 6/2009 | Robinson | 348/222.1 |
| 2010/0079615 A1 | * | 4/2010 | Hatakeyama | 348/223.1 |
| 2010/0079626 A1 | * | 4/2010 | Hatakeyama | 348/241 |

FOREIGN PATENT DOCUMENTS

| | | |
|---|---|---|
| CN | 1285997 A | 2/2001 |
| CN | 101204083 A | 6/2008 |
| JP | 2007-028040 A | 2/2007 |
| JP | 2008-85773 A | 4/2008 |

OTHER PUBLICATIONS

Chinese office action cited in Chinese counterpart application No. CN201110075113.4, dated Mar. 22, 2013. English translation provided.

* cited by examiner

*Primary Examiner* — Roberto Velez
*Assistant Examiner* — Cynthia Segura
(74) *Attorney, Agent, or Firm* — Rossi, Kimms & McDowell LLP

(57) ABSTRACT

The image processing apparatus performs image processing on an input image produced by image pickup of a scene through an optical system, the scene including plural objects whose object distances are mutually different. The apparatus includes a filter acquisition part acquiring a chromatic aberration correction filter for an out-of-focus area in the input image and an image restoration filter, and a processing part performing chromatic aberration correction processing using the chromatic aberration correction filter and image restoration processing using the image restoration filter on the input image. The filter acquisition part acquires the chromatic aberration correction filter by using information on chromatic aberration of the optical system, information on an in-focus distance of the optical system in the image pickup of the scene, and information on the distances to the respective objects.

22 Claims, 9 Drawing Sheets

R ———
G – – –
B ·······

IMAGE PROCESSING APPARATUS, INCLUDING A FILTER ACQUISITION PART, AND IMAGE PICKUP APPARATUS

BACKGROUND OF THE INVENTION

1. Field of the Invention

The present invention relates to an image processing technique for reducing a chromatic aberration component and a blur component included in an image produced by image pickup.

2. Description of the Related Art

Images produced by image pickup apparatuses such as digital cameras include a blur component (image blur component) that is an image deterioration component caused by various aberrations of an image taking optical system (hereinafter simply referred to as an "optical system") such as spherical aberration, comatic aberration, field curvature and astigmatism. Such a blur component is generated because a light flux emitted from one point of an object forms an image with some divergence on an image pickup surface, the light flux being normally converged at one point if there is no aberration or diffraction.

The blur component herein is optically expressed as a point spread function (PSF), and is different from blur caused by defocusing. Moreover, color blur in a color image caused due to longitudinal chromatic aberration, chromatic spherical aberration or chromatic comatic aberration of the optical system can be said to be a difference between blurring degrees of respective light wavelengths.

As a method for correcting the blur component of the image, there is known a correction method that uses information on an optical transfer function (OTF) of the optical system. This method is referred to as "image restoration". Hereinafter, processing for correcting (reducing) the blur component of the image by using the information on the optical transfer function (OTF) of the optical system is referred to as "image restoration processing".

The outline of the image restoration processing is as follows. When $g(x, y)$ represents a degraded image (input image) including the blur component, $f(x, y)$ represents an non-degraded original image, $h(x, y)$ represents the point spread function (PSF) that forms a Fourier pair with the optical transfer function, * represents convolution, and $(x, y)$ represents coordinates on the image, the following expression is established:

$$g(x,y)=h(x,y)*f(x,y) \qquad (1)$$

Moreover, converting the above expression into a form of a two-dimensional frequency surface through Fourier transformation shows the following expression of a form of a product for each frequency:

$$G(u,v)=H(u,v)\cdot F(u,v) \qquad (2)$$

where H indicates a result of Fourier transformation of the point spread function (PSF), in other words, an optical transfer function (OTF), and $(u, v)$ indicates coordinates on the two-dimensional frequency surface, in other words, a frequency.

In order to acquire the original image from the degraded image, both sides of the expression only need to be divided by H as below:

$$G(u,v)/H(u,v)=F(u,v) \qquad (3)$$

Returning the $F(u, v)$ through inverse Fourier transformation to a real surface enables acquisition of a restored image equivalent to the original image $f(x, y)$.

When R represents a result of inverse Fourier transformation of $H^{-1}$, performing convolution processing for an image in the real surface as represented by the following expression similarly enables acquisition of the original image.

$$g(x,y)*R(x,y)=f(x,y) \qquad (4).$$

This $R(x, y)$ in the above expression is referred to as an "image restoration filter". A real image includes a noise component, and hence use of the image restoration filter produced from a complete inverse of the optical transfer function (OTF) as described above results in amplification of the noise component together with the degraded image. Therefore, generally, a good image cannot be acquired. In this regard, there is known a method such as use of a Wiener filter for suppressing a high frequency side restoration rate of an image according to an intensity ratio of an image signal to a noise signal. Degradation of a color blur component of an image is substantially corrected by, for example, causing blur amounts of respective color components to be uniform by the correction of the blur component.

Japanese Patent Laid-Open No. 2007-028040 discloses a method of correcting color shift due to longitudinal chromatic aberration. Since peak positions of MTFs (modulation transfer functions) of the respective color components are different from each other due to the longitudinal chromatic aberration, the MTFs of the respective colors have differences. An image of a color component whose MTF is low is blurred with respect to an image of a color component whose MTF is high, which generates color blur. The method disclosed in the image of the Japanese Patent Laid-Open No. 2007-028040 estimates the image of the color component whose MTF is low, by using the image of the color component whose MTF is high, so as to eliminate the difference between MTF characteristics of the respective colors, thereby reducing the color shift.

Moreover, Japanese Patent Laid-Open No. 2008-085773 discloses the following method of correcting the color blur. This method moves an image pickup element and an optical system relatively to each other in an optical axis direction to perform image pickup plural times when image formation positions of lights of peak wavelengths in respective color components are located on the image pickup element so as to obtain plural color images. Then, the method combines the plural color images obtained by the image pickup into one image and then outputs it. This method makes it possible to eliminate differences between image formation characteristics of the color components to reduce the color blur in the combined image.

A correction filter used to correct the color blur is normally optimized for a state where an optical system of an image pickup apparatus is in an in-focus state (focused state). Therefore, applying the correction filter to an out-of-focus area (defocused area) in an image provides different correction from that for an in-focus area (focused area) in the image. For example, chromatic aberration in the in-focus area where an object distance is equal to an in-focus distance is different from that in the out-of-focus area where the object distance is different from the in-focus distance. In particular, when longitudinal chromatic aberration is generated, the respective color components are separated from each other to form MTF peaks in an MTF characteristic in the optical axis direction.

FIG. 9A shows separation of respective wavelength components (color light components) of white light emerging from an optical system 201 having longitudinal chromatic aberration. The respective color light components that have passed through the optical system 201 form images at mutually different positions, which results in formation of MTF peaks of respective colors each centering on an image formation position of each color light components as shown in FIG. 9B. An image acquired by an image pickup element 202 includes differences of the MTFs of the respective colors.

FIG. 10B shows an image restoration effect of an image restoration filter when being applied to an in-focus area of an image acquired by image pickup through an optical system having an MTF characteristic shown in FIG. 10A. When applying such an image restoration filter to an out-of-focus area of the image, MTFs of respective colors have differences as shown in FIG. 10D. This is because $H^{-1}$ in the above-described expression (3) increases the MTF in the out-of-focus area by a same rate as that in the in-focus area. In the in-focus area and the out-of-focus area, shapes of OTFs and relationships of the OTFs of R, G and B components are mutually different, and therefore applying the image restoration filter to the out-of-focus area without change generates mismatch between the color components.

In comparison of FIG. 10C with FIG. 10A, the MTFs of the G and B components are deteriorated, but the MTF of the R component is improved. Thus, applying the same image restoration filter as that for the in-focus area to the out-of-focus area excessively increases an image restoration effect for the R component and decreases image restoration effects for the B and G components, which increases the differences between the MTFs of the respective color components as shown in FIG. 10D.

In this case, at an edge portion of an image shown in FIG. 11A, luminances of the G and B components are significantly different from that of the R component as shown in FIG. 11B, which causes a color blur-like appearance. Specifically, although the MTF of the R component is increased, the MTFs of the B and G components are kept to be low. This makes the B and G components noticeable at the edge portion to emphasize the color blur more than before the image restoration.

The method disclosed in Japanese Patent Laid-Open No. 2007-028040 estimates the image whose MTF is low by gradating the image whose MTF is high, and therefore resolution of the entire image is decreased.

Moreover, the method disclosed in Japanese Patent Laid-Open No. 2008-085773 sequentially performs image pickup plural times to acquire the plural color images, and therefore time differences are generated between the plural color images. This may cause changes in position, size and the like of the object between the respective color images. In this case, combining the plural color images without change generates color shift in the combined image. Moreover, magnifications of the respective color images are different from each other, which generates color shift due to chromatic aberration of magnification in a peripheral area of the combined image.

Furthermore, each of the methods disclosed in Japanese Patent Laid-Open Nos. 2007-028040 and 2008-085773 is applied to the color blur in the in-focus area, and therefore does not consider the color blur in the out-of-focus area. Thus, the method cannot reduce the color blur in the out-of-focus area after the image restoration.

SUMMARY OF THE INVENTION

The present invention provides an image processing apparatus, an image pickup apparatus, an image processing computer program and a storage medium storing therein the image processing computer program capable of reducing color blur emphasized in an out-of-focus area in an output image after image restoration.

The present invention provides as one aspect thereof an image processing apparatus configured to perform image processing on an input image produced by image pickup of a scene through an optical system, the scene including plural objects whose distances from the optical system are mutually different. The apparatus includes a filter acquisition part configured to acquire a chromatic aberration correction filter for reducing a chromatic aberration component included in an out-of-focus area in the input image and an image restoration filter for reducing a blur component included in the input image, and a processing part configured to perform chromatic aberration correction processing using the chromatic aberration correction filter and image restoration processing using the image restoration filter on the input image. The filter acquisition part acquires the chromatic aberration correction filter by using information on chromatic aberration of the optical system, information on an in-focus distance of the optical system in the image pickup of the scene, and information on the distances to the respective objects.

The present invention provides as another aspect thereof an image pickup apparatus including an image pickup system configured to perform image pickup through an optical system and the above-described image processing apparatus.

The present invention provides as still another aspect thereof an image processing computer program causing a computer to perform image processing. The program includes a step of acquiring an input image produced by image pickup of a scene through an optical system, the scene including plural objects whose distances from the optical system are mutually different, a filter acquisition step of acquiring a chromatic aberration correction filter for reducing a chromatic aberration component included in an out-of-focus area in the input image and an image restoration filter for reducing a blur component included in the input image, and a processing step of performing chromatic aberration correction processing using the chromatic aberration correction filter and image restoration processing using the image restoration filter on the input image. In the filter acquisition step, the chromatic aberration correction filter is acquired by using information on chromatic aberration of the optical system, information on an in-focus distance of the optical system in the image pickup of the scene, and information on the distances to the respective objects.

The present invention provides as yet still another aspect thereof a recording medium stored therein the above-described image processing computer program.

Further features of the present invention will become apparent from the following description of exemplary embodiments (with reference to the attached drawings).

DESCRIPTION OF THE PREFERRED EMBODIMENTS

Exemplary embodiments of the present invention will hereinafter be described with reference to the accompanying drawings.

[Embodiment 1]

Figure 1:
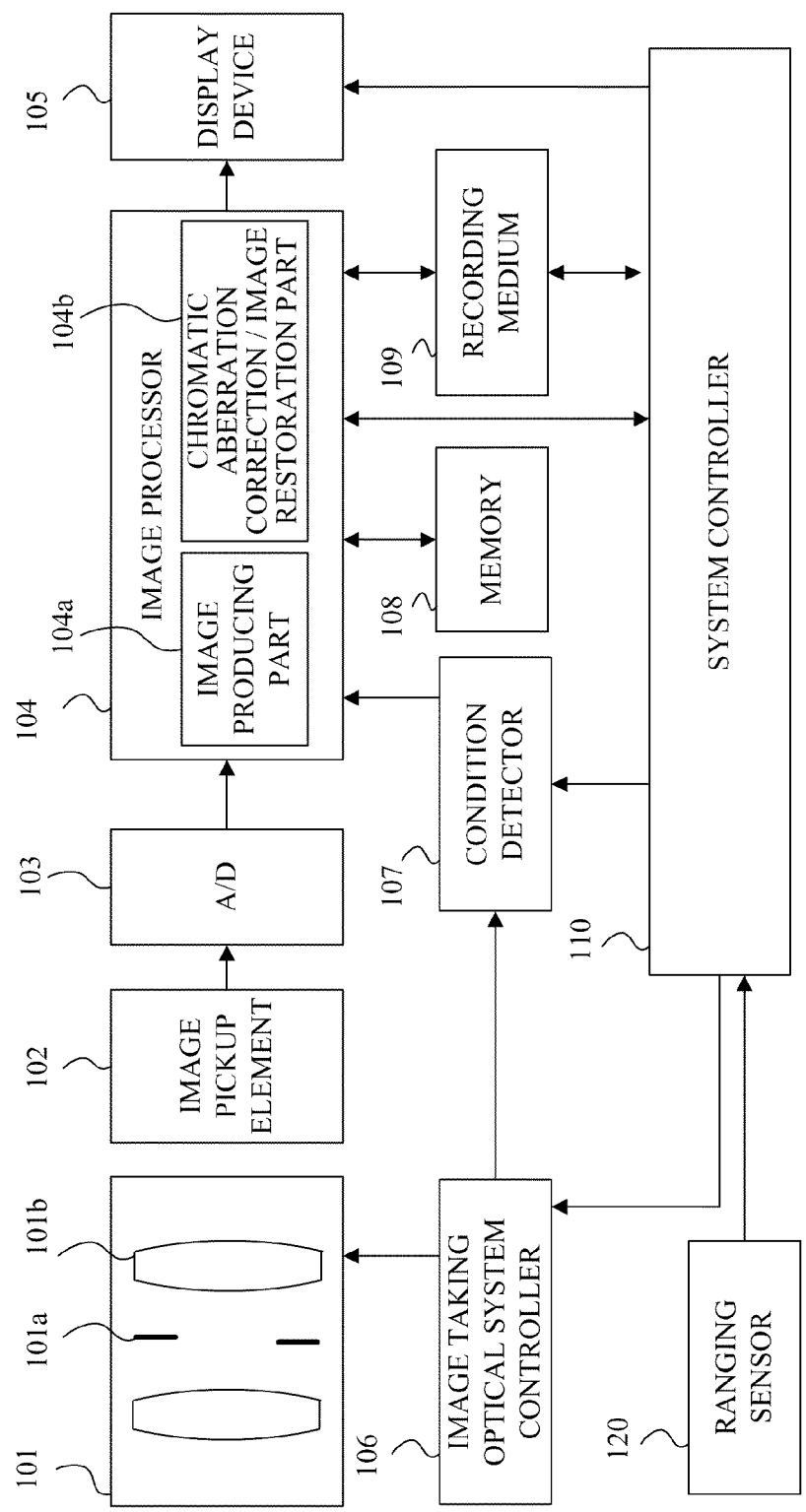
FIG. 1 is a block diagram showing a configuration of an image pickup apparatus that is Embodiment 1 of the present invention.

FIG. 1 shows a configuration of an image pickup apparatuses such as a digital camera and a video camera including an image processing apparatus (or using an image processing method) that is a first embodiment (Embodiment 1) of the present invention.

A light flux from an object (not shown) passes through an image taking optical system 101 to form an object image on an image pickup element 102 constituted by a CCD sensor, a CMOS sensor or the like. The image taking optical system 101 includes a magnification varying lens (not shown) that is moved for zooming, an aperture stop 101a, and a focus lens 101b that is moved for focusing. Moving the magnification varying lens in an optical axis direction enables the zooming for changing a focal length of the image taking optical system 101. The aperture stop 101a adjusts the amount of light reaching the image pickup element 102 by increasing and decreasing its aperture diameter. The focusing according to an object distance is performed by controlling a position of the focus lens 101b in the optical axis direction by an auto-focus (AF) function of an image taking optical system controller 106.

The object image formed on the image pickup element 102 is converted into an electrical signal by the image pickup element 102. An analog output signal from the image pickup element 102 is converted into a digital image pickup signal by an A/D converter 103 to be input to an image processor 104.

A condition detector 107 detects a condition of the image taking optical system 101. The condition is hereinafter referred to as an "image pickup condition". The image pickup condition includes, for example, the focal length (zoom position) of the image taking optical system 101, the aperture diameter (aperture value or F-number) of the aperture stop 101a and a focus lens position (that is, an in-focus distance which will be described later).

The image processor 104 includes an image producing part 104a that performs various processing on the input digital image pickup signal to produce a full-color input image and a chromatic aberration correction/image restoration processing part 104b serving as a filter acquisition part and a processing part. A system from the image pickup element 102 to the image producing part 104a constitutes an image pickup system.

The chromatic aberration correction/image restoration processing part 104b acquires the input image produced by the image pickup system. Moreover, the chromatic aberration correction/image restoration processing part 104b acquires a chromatic aberration correction filter by producing it, and performs chromatic aberration correction processing using the chromatic aberration correction filter on the input image. The chromatic aberration correction/image restoration processing part 104b may acquire the chromatic aberration correction filter to be used for the chromatic aberration correction processing by selecting it from two or more chromatic aberration correction filters stored in advance in a memory 108.

In this embodiment, the chromatic aberration correction processing and image restoration processing which will be described later are not performed directly on the full-color input image produced by the image pickup system, but are performed on correction target color images (two of R, G and B images which will be described later) obtained by conversion from the full-color input image. However, in this embodiment and other embodiments described below, not only the full-color input image but also the correction target color image are referred to as an "input image".

In addition, the chromatic aberration correction/image restoration processing part 104b acquires a blur correction filter as an image restoration filter by producing it according to the image pickup condition detected by the condition detector 107, and then performs image restoration processing on the input image by using the image restoration filter. The chromatic aberration correction/image restoration processing part 104b may acquire the blur correction filter to be used for the image restoration processing by selecting it from two or more blur correction filters stored in advance in the memory 108.

The chromatic aberration correction/image restoration processing part 104b corresponds to an image processing apparatus performing the image processing on the input image.

The memory 108 stores information on chromatic aberration of the image taking optical system 101 in each of plural areas set in an image pickup frame. The information on the chromatic aberration in this embodiment includes chromatic aberrations generated for various object distances in various image pickup conditions such as zoom conditions (focal lengths or positions of the magnification varying lens), in-focus conditions (in-focus positions of the focus lens) and aperture conditions (aperture diameters). Moreover, the object distance includes a distance (in-focus distance) to an object on which the image taking optical system 101 is in focus and a distance to an object located at an out-of-focus position where the image taking optical system 101 is not in focus. Information on the object distance may be replaced by a signal indicating a detection result of a focus detector (not shown), that is, whether or not the image taking optical system 101 is in focus, or by a signal indicating a defocus amount from the in-focus position of the focus lens.

Figure 2:
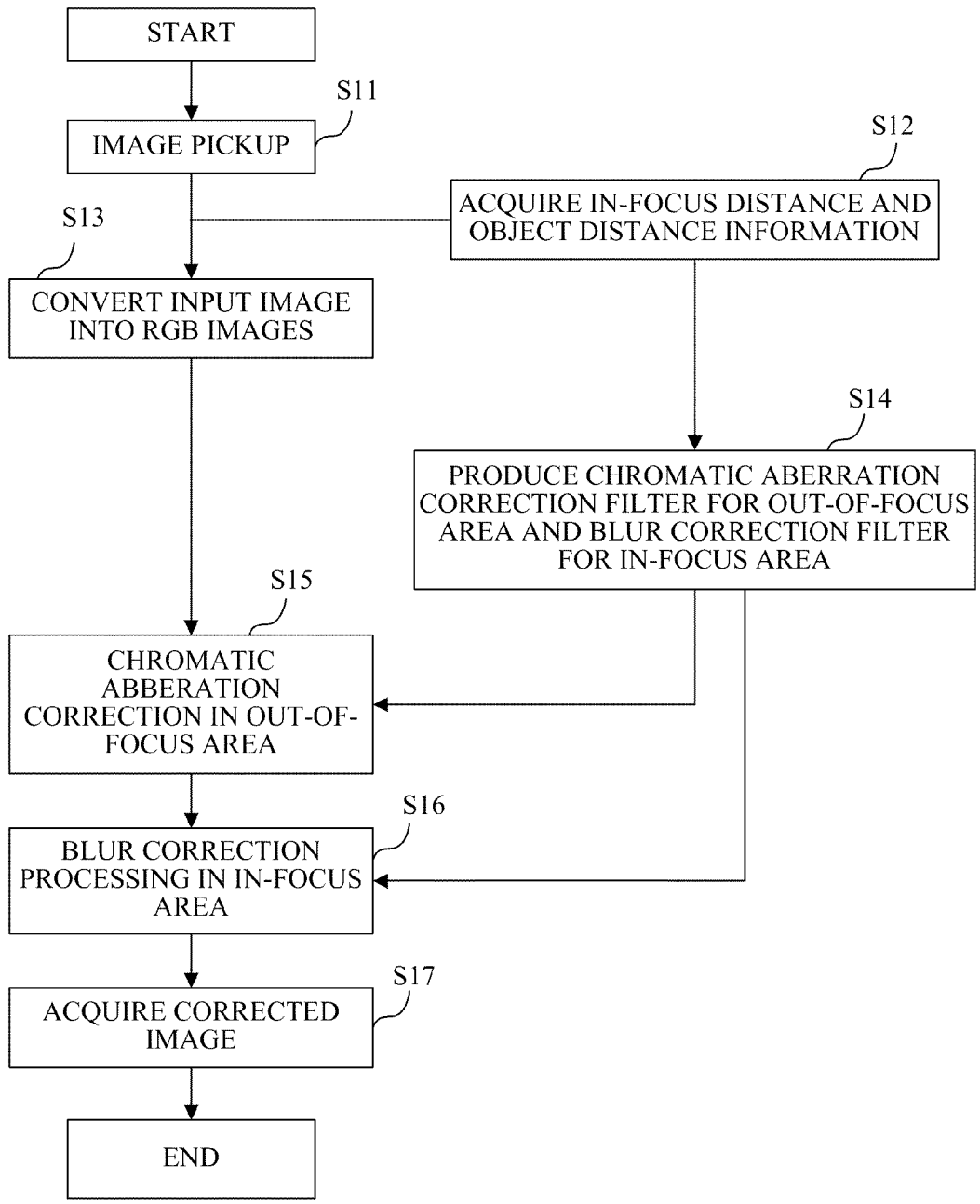
FIG. 2 is a flowchart showing processing performed in the image pickup apparatus of Embodiment 1.

FIG. 2 shows a flowchart of processing (image processing method) including image pickup processing performed by the image producing part 104a and the chromatic aberration correction and image restoration processing performed by the chromatic aberration correction/restoration processing part 104b. The image producing part 104a and the chromatic aberration correction/restoration processing part 104b are hereinafter collectively referred to as the image processor 104. The image processor 104 is constituted by an image processing computer, and executes the above processing according to a computer program (image processing computer program).

At step S11, the image processor 104 performs the image pickup processing to produce an RGB full-color input image as an original image on the basis of the output signal from the image pickup element 102. Description will be made of a case where image pickup is performed for a scene including plural objects whose object distances are mutually different and therefore the input image includes images of the plural objects.

At step S12, the image processor 104 acquires information on the in-focus distance of the image taking optical system 101 at the time of the image pickup processing, that is, information on a distance from the image taking optical system 101 to a position on which the image taking optical system 101 is in focus. Moreover, the image processor 104 also acquires information on the object distances from the image pickup apparatus (that is, from the image taking optical system 101) to the respective objects. The information on the object distance can be acquired by the following method. A ranging sensor (distance measuring sensor) 120 projects assist light from its light projecting part onto each object, receives the assist light reflected on the object at its light receiving part, and then performs triangulation. However, the information on the object distance may be acquired by other methods.

At step S13, the image processor 104 converts the input image into plural color images (three color images in this embodiment) including an R image, a G image and a B image. Although this embodiment describes the case where the input image is converted into the color images in an RGB space, the input image may be converted into color images in color spaces other than the RGB space, such as a YCC space.

Next, at step S14, the image processor 104 detects areas where the respective objects exist in the input image (image pickup frame), and reads the information on the chromatic aberrations of the image taking optical system 101 corresponding to the areas where the respective objects exist from the memory 108.

Then, the image processor 104 produces the chromatic aberration correction filter to reduce (correct) a chromatic aberration component included in the out-of-focus area in the input image, by using the information on the chromatic aberration, and the information on the in-focus distance and the information on the object distances that have been acquired at step S12. The chromatic aberration correction filter is respectively produced for two color images (correction target color images) of the R, G and B images. The produced chromatic aberration correction filters for the two color images are mutually different filters.

The out-of-focus area is an area where a difference between the object distance and the in-focus distance is larger than a predetermined amount. The in-focus area is an area where the difference between the object distance and the in-focus distance is equal to or smaller than the predetermined amount.

In addition, the image processor 104 produces the blur correction filter (image restoration filter) corresponding to the image pickup condition at the time of the image pickup processing. This blur correction filter is applied to the in-focus area in the input image so as to reduce (correct) a blur component (image blur component) included in the input image.

Figure 3A:
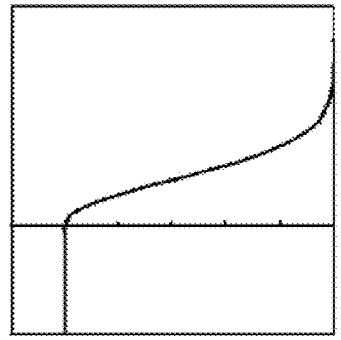
FIGS. 3A, 3B and 3C respectively show luminances of R, G and B at an edge portion in an out-of-focus area before chromatic aberration correction processing, after the chromatic aberration correction processing and after image restoration processing in Embodiment 1.
Figure 3B:
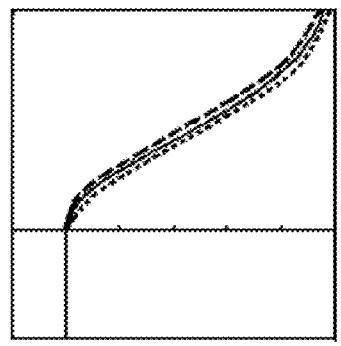

Then, at step S15, the image processor 104 applies, to the two correction target color images, the chromatic aberration correction filters corresponding thereto, thereby performing the chromatic aberration correction processing for correcting the chromatic aberration between R, G and B in the out-of-focus area. The chromatic aberration correction processing makes it possible to reduce, as shown in FIG. 3B, differences of shapes of point spread functions (PSFs) of R, G and B, which are large as shown in FIG. 3A before the chromatic aberration correction processing.

As the correction target color images for which the chromatic aberration correction filters are produced, any two of the R, G and B images may be selected. However, it is desirable to select, as a reference color image, one color image having the highest MTF before the chromatic aberration correction processing among the three color images such as the R image, and to select, as the correction target color images, the two color images other than the reference color image. In this case, the blur correction filter is optimized for the in-focus distance (or the in-focus area) obtained from the PSF of the reference color image.

Figure 3C:
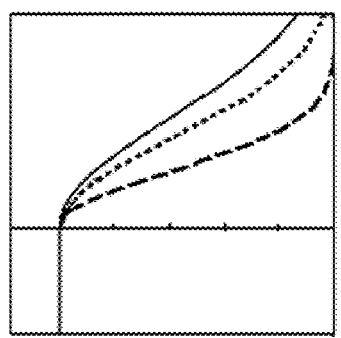

At step S16, the image processor 104 performs the image restoration processing by applying the blur correction filter to the R, G and B images whose differences of the PSF shapes have been reduced by the chromatic aberration correction processing performed at step S15 to reduce the blur component as shown in FIG. 3C. That is, the image processor 104 applies, to the R, G and B images whose chromatic aberration has been reduced and thereby whose differences of the MTFs have been almost eliminated, the blur correction filter that is common to the R, G and B images. This prevents an effect of the image restoration from being strengthened or weakened further for only one color image than for the other color images, which can prevent the color blur from being emphasized by the image restoration processing. Moreover, the use of the blur correction filter optimized for the in-focus area can prevent an out-of-focus looking (bokeh) of the input image from being removed by excessive image restoration in the out-of-focus area.

At step S17, the image processor 104 combines the reference color image with the correction target color images on which the chromatic aberration correction processing and the image restoration processing have been performed to produce a corrected image, and then stores it to a recording medium 109 and displays it on a display device 105 provided on the image pickup apparatus. Moreover, the image processor 104 may output the corrected image to an external apparatus such as a personal computer or a printer.

As described above, this embodiment acquires the object distances of the plural objects included in the input image at the time of the image pickup processing, and reduces the color blur that is emphasized by the image restoration processing by using the information on the chromatic aberrations corresponding to the object distances.

Figure 4:
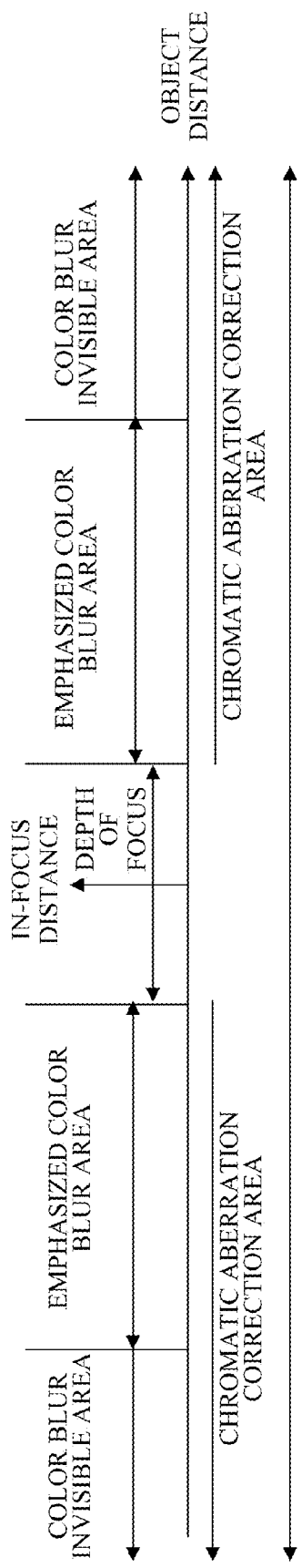
FIG. 4 shows a relationship of an object distance and areas where the chromatic aberration correction processing and/or the image restoration processing are/is performed in Embodiment 1.

FIG. 4 shows a relationship in the input image (color image) between the object distance and the areas on which the chromatic aberration correction filter and/or the blur correction filter are/is applied in this embodiment. An area corresponding to a depth of focus of the image taking optical system 101 and centering on the in-focus distance is the in-focus area. In the out-of-focus area that is outside the in-focus area, a partial area where the difference between the object distance and the in-focus distance is within a certain range (in other words, where a blur degree is small) has a noticeable chromatic aberration component. Such a partial area is referred to as an "emphasized color blur area". FIG. 4 shows a case where two emphasized color blur areas exist in the input image. On the other hand, in the out-of-focus area, a partial area where the difference between the object distance and the in-focus distance exceeds the certain range has a noticeable blur, which makes the chromatic aberration component unnoticeable. Such a partial area is referred to as a "color blur invisible area". FIG. 4 shows a case where two color blur invisible areas exist in the input image.

Thus, it is necessary to apply the chromatic aberration correction filter to the emphasized color blur area between the in-focus area and the color blur invisible area. Therefore, this embodiment produces the chromatic aberration correction filter corresponding to the object distance of the emphasized color blur area, and applies to the entire input image the blur correction filter optimized to the in-focus distance regardless of the object distance in this embodiment. Such processing makes it possible to sufficiently correct the chromatic aberration component in the out-of-focus area in the input image, which enables reduction of the color blur in the out-of-focus area in the corrected image after the image restoration processing.

[Embodiment 2]

Figure 5:
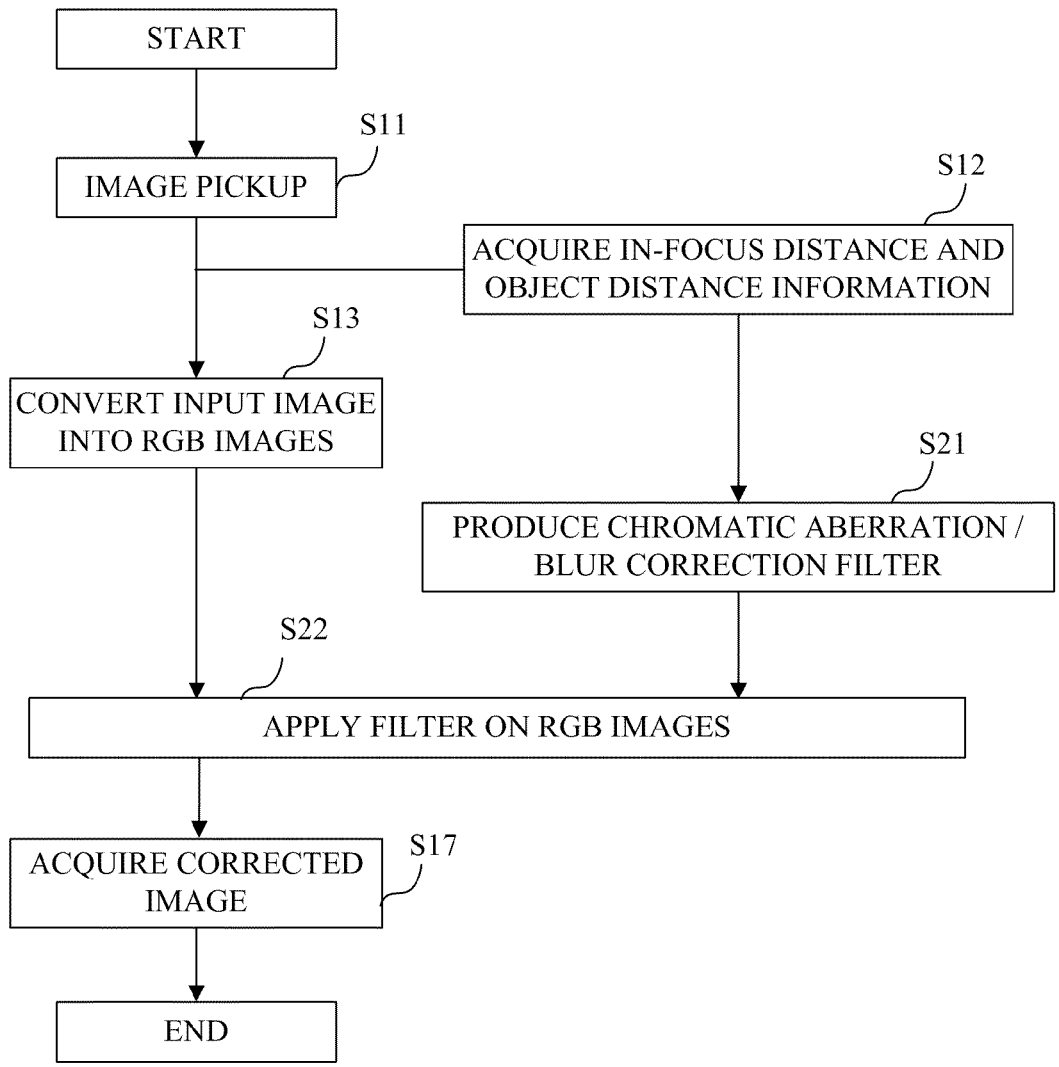
FIG. 5 is a flowchart showing processing performed in an image pickup apparatus that is Embodiment 2 of the present invention.

FIG. 5 shows a flowchart of processing (image processing method) including image pickup processing, chromatic aberration correction processing and image restoration processing performed by an image processor 104 in an image pickup apparatus that is a second embodiment (Embodiment 2) of the present invention. A configuration of the image pickup apparatus of this embodiment is same as that of the image pickup apparatus of Embodiment 1, and components common to those in Embodiment 1 are denoted by the same reference numerals as those in Embodiment 1.

At steps S11 to S13, the image processor 104 performs same processes as those at steps S11 to S13 in Embodiment 1.

At step S21, the image processor 104 detects the areas where the respective objects exist in the input image, and reads the information on the chromatic aberrations of the image taking optical system 101 corresponding to the areas where the respective objects exist from the memory 108. Then, the image processor 104 produces a chromatic aberration/blur correction filter having a chromatic aberration correction function for the out-of-focus area and a blur correction function optimized for the in-focus distance, by using the information on the chromatic aberration, the information on the in-focus distance and the information on the object distances. The chromatic aberration/blur correction filter is respectively produced for the R, G and B images obtained by conversion from the input image at step S13. The chromatic aberration/blur correction filters for the R, G and B images are mutually different filters.

At step S22, the image processor 104 applies the chromatic aberration/blur correction filter produced for each of the R, G and B images to each of them so as to produce a color image in which the chromatic aberration (color blur) component and the blur component have been reduced in a single application of the chromatic aberration/blur correction filter. Then, at step S17, the image processor 104 produces a corrected image as in Embodiment 1.

[Embodiment 3]

Figure 6:
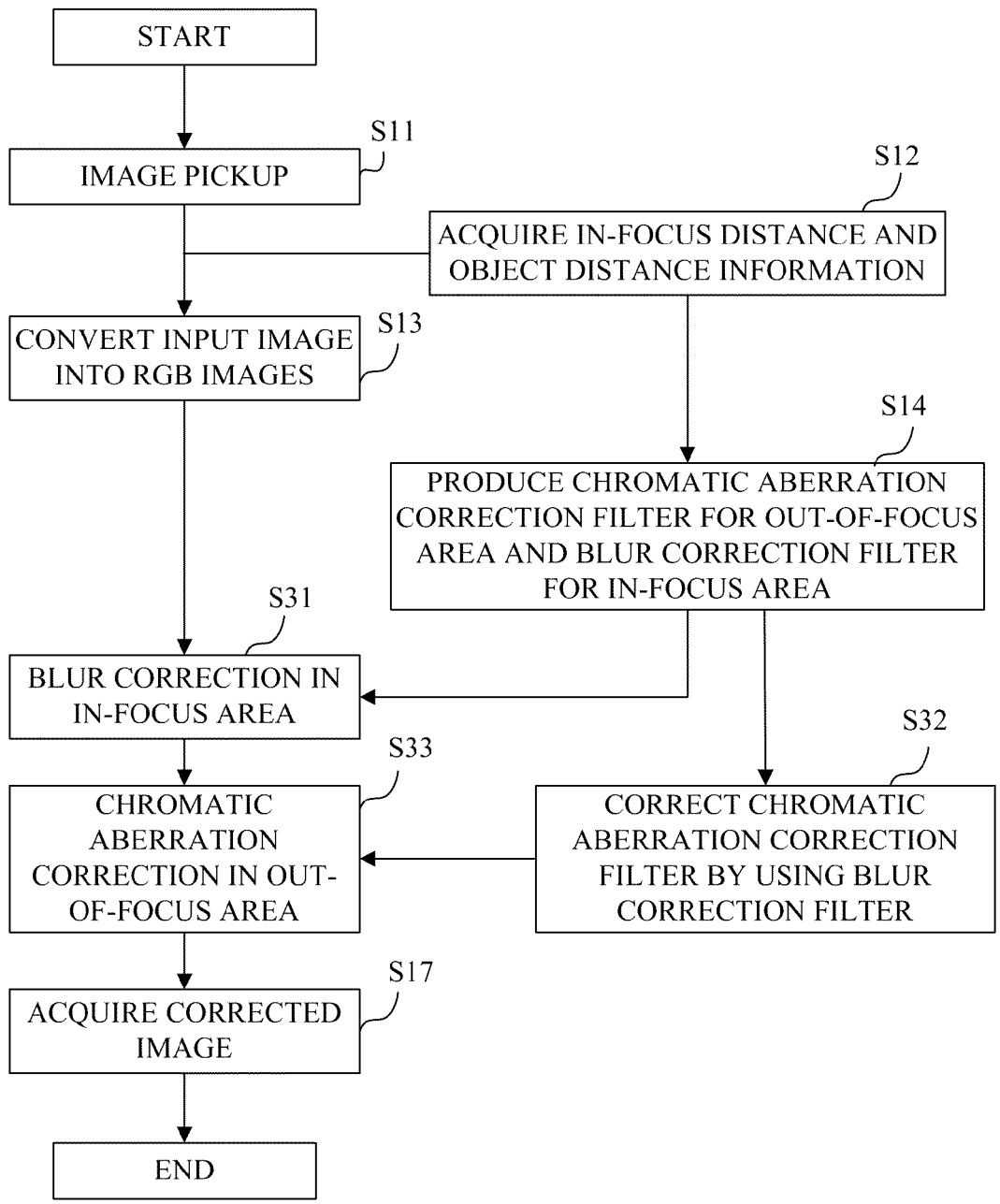
FIG. 6 is a flowchart showing processing performed in an image pickup apparatus that is Embodiment 3 of the present invention.

FIG. 6 shows a flowchart of processing (image processing method) including image pickup processing, chromatic aberration correction processing and image restoration processing performed by an image processor 104 in an image pickup apparatus that is a third embodiment (Embodiment 3) of the present invention. A configuration of the image pickup apparatus of this embodiment is same as that of the image pickup apparatus of Embodiment 1, and components common to those in Embodiment 1 are denoted by the same reference numerals as those in Embodiment 1.

At steps S11 to S14, the image processor 104 performs same processes as those at steps S11 to S14 in Embodiment 1. At step S14, the image processor 104 produces a blur correction filter that is commonly used for both the out-of-focus area and the in-focus area and is optimized for the in-focus distance. The image processor 104 further produces the chromatic aberration correction filters.

At step S31, the image processor 104 applies the blur correction filter produced at step S14 to the R, G and B images obtained by conversion from the input image at step S13 to perform the image restoration processing. If there is the chromatic aberration component in the out-of-focus area, the image restoration processing emphasizes color blur.

This color blur includes not only the chromatic aberration of the image taking optical system 101, but also a color blur component emphasized by the blur correction filter optimized for the in-focus distance. Thus, at step S32, the image processor 104 corrects the chromatic aberration correction filters for the out-of-focus area, which has been produced at step S14, by using the blur correction filter optimized for the in-focus distance.

Then, at step S33, the image processor 104 applies the corrected chromatic aberration correction filters to the images after the image restoration processing to perform the chromatic aberration correction processing. Thus, at step S17, the image processor 104 produces a corrected image as in Embodiment 1.

This embodiment can produce the corrected image in which the color blur is sufficiently reduced without eliminating bokeh.

[Embodiment 4]

Figure 7:
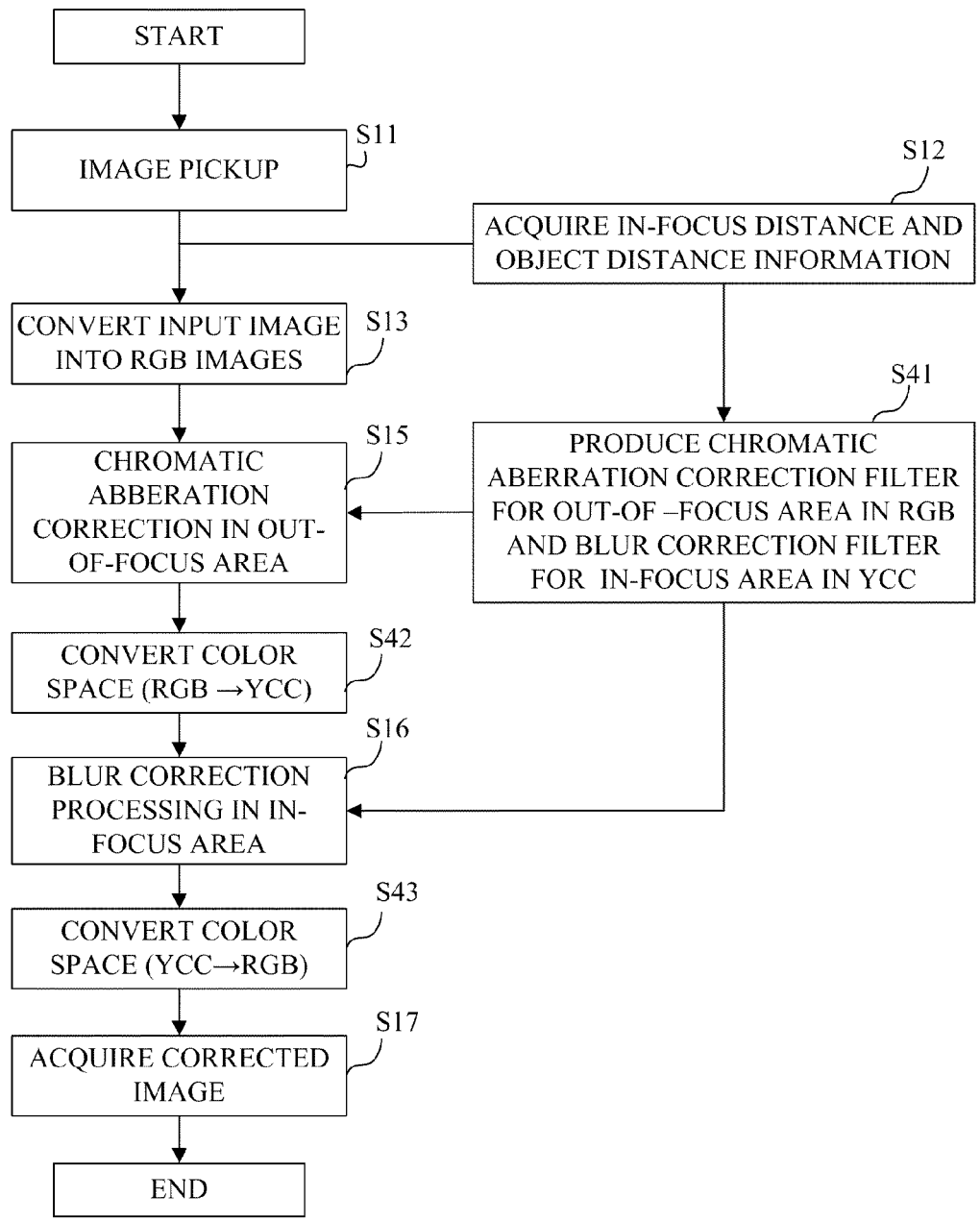
FIG. 7 is a flowchart showing processing performed in an image pickup apparatus that is Embodiment 4 of the present invention.

FIG. 7 shows a flowchart of processing (image processing method) including image pickup processing, chromatic aberration correction processing and image restoration processing performed by an image processor 104 in an image pickup apparatus that is a fourth embodiment (Embodiment 4) of the present invention. A configuration of the image pickup apparatus of this embodiment is same as that of the image pickup apparatus of Embodiment 1, and components common to those in Embodiment 1 are denoted by the same reference numerals as those in Embodiment 1.

At steps S11 to S13, the image processor 104 performs same processes as those at steps S11 to S13 in Embodiment 1.

At step S41, the image processor 104 produces chromatic aberration correction filters for the out-of-focus area by using the information on the chromatic aberration, and the information on the in-focus distance and the information on the object distances that have been acquired at step S12.

Then, at step S15, the image processor 104 applies the chromatic aberration correction filters to the R, G and B images obtained by conversion of the input image at step S13 so as to perform the chromatic aberration correction processing.

At step S42, the image processor 104 converts the R, G and B images after the chromatic aberration correction processing into images in $YC_RC_B$ space.

Moreover, at step S41 described above, the image processor 104 produces a blur correction filter optimized for the in-focus area in the $YC_RC_B$ space. Then, at step S16, the image processor 104 performs the image restoration processing using the blur correction filter.

At step S43, the image processor 104 again converts the image in the $YC_RC_B$ space after the image restoration processing into an image in an RGB space.

This embodiment performs the image restoration processing after converting the image in the RGB space into the image of the $YC_RC_B$ space to cut color information, which can prevent increase of a color blur amount caused by the image restoration processing. Thereby, this embodiment can acquire a corrected image with almost no color shift at step S17.

[Embodiment 5]

Figure 8:
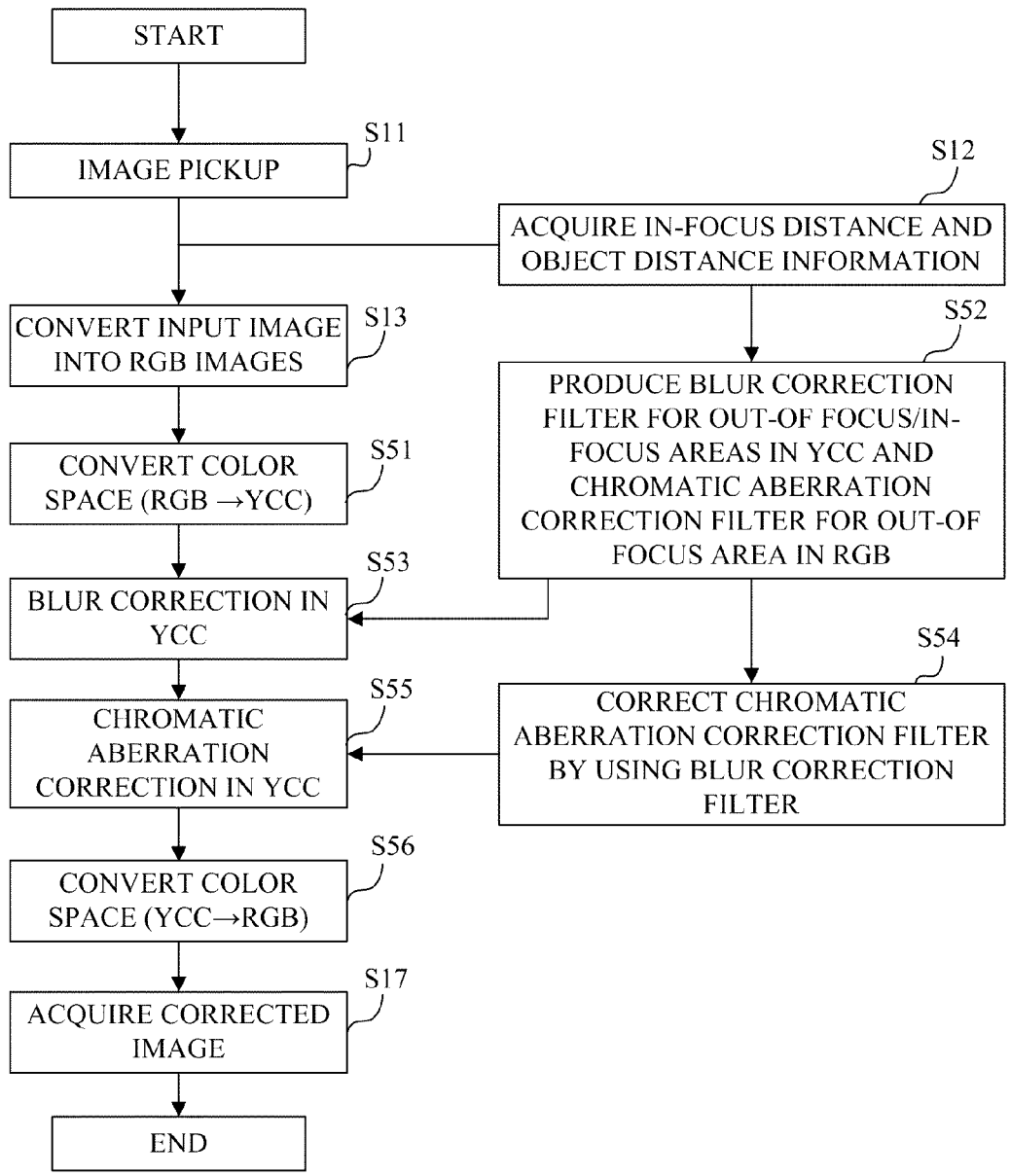
FIG. 8 is a flowchart showing processing performed in an image pickup apparatus that is Embodiment 5 of the present invention.
Figure 9A:
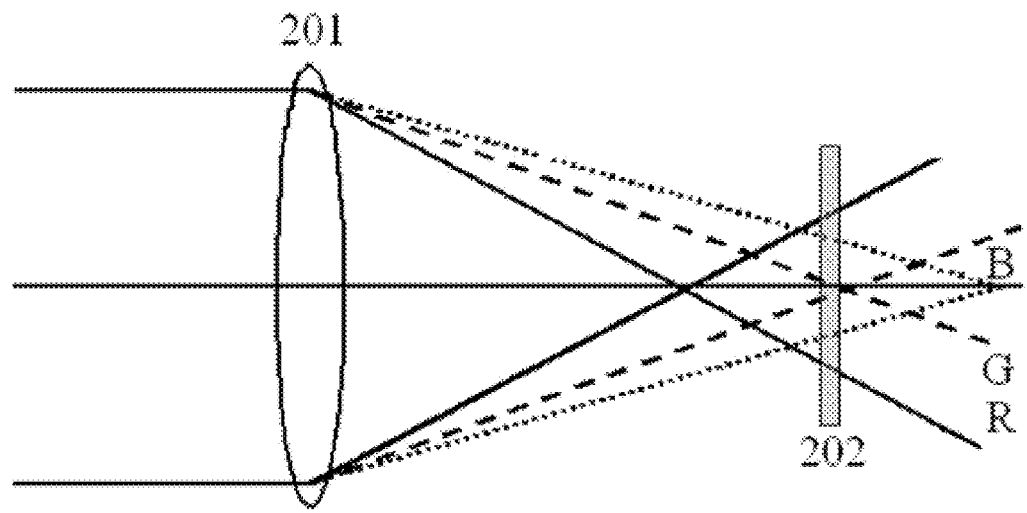
FIGS. 9A and 9b respectively show longitudinal chromatic aberration generated in an optical system and MTFs of respective colors.
Figure 9B:
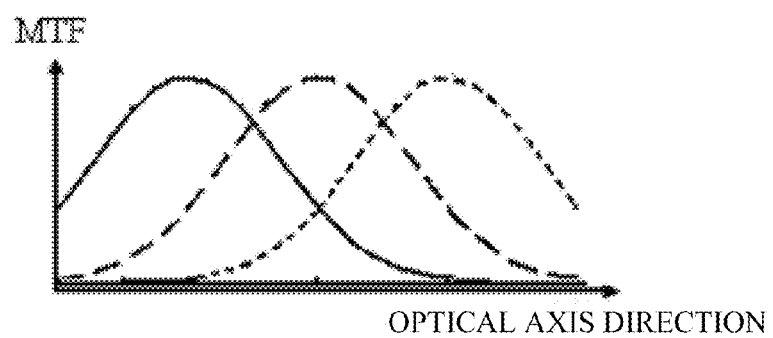
Figure 10A:
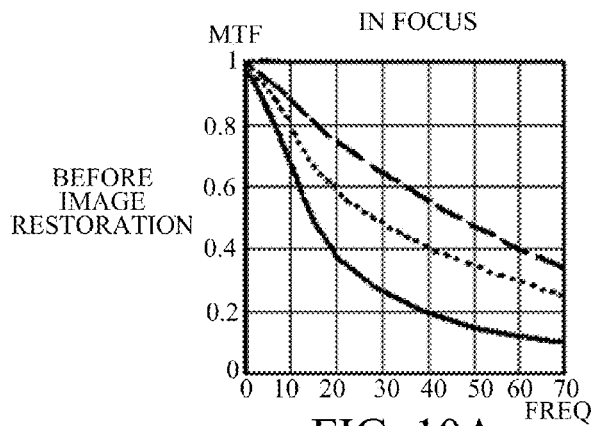
FIGS. 10A and 10B respectively show MTFs before and after an image restoration filter optimized for an in-focus area is applied to the in-focus area, and FIGS. 10C and 10D respectively show MTFs before and after the image restoration filter is applied to the out-of-focus area.
Figure 10C:
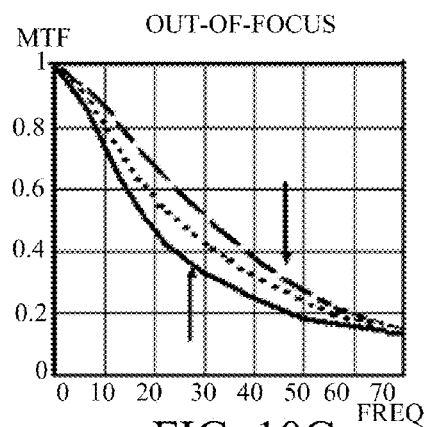
Figure 10B:
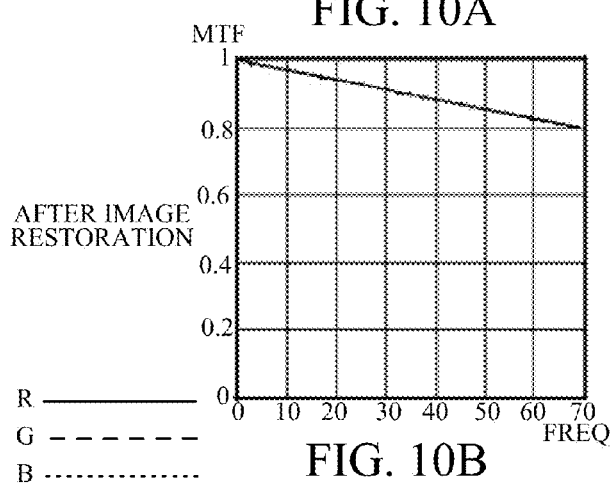
Figure 10D:
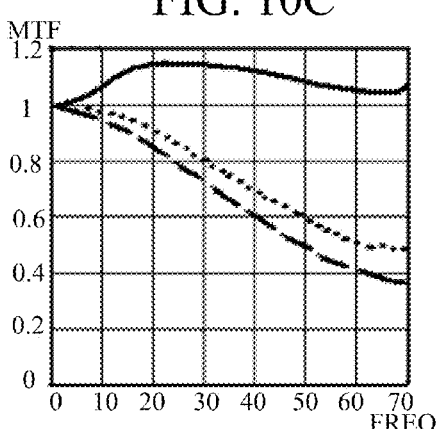
Figure 11A:
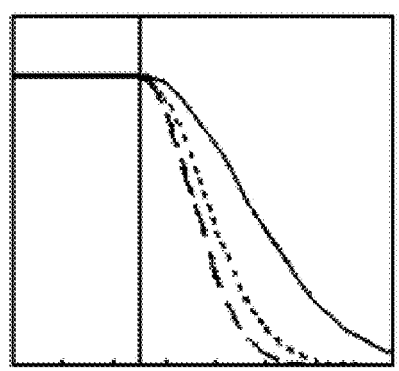
FIGS. 11A and 11B show luminances of R, G and B at an edge portion in an image before and after an image restoration filter optimized to the in-focus area is applied to the out-of-focus area.
Figure 11B:
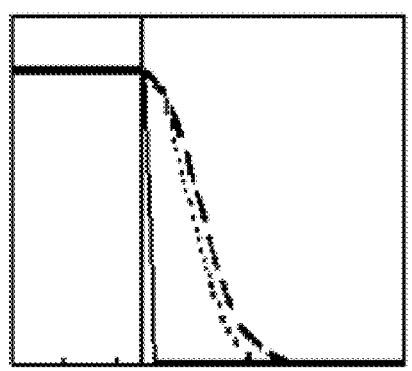

FIG. 8 shows a flowchart of processing (image processing method) including image pickup processing, chromatic aberration correction processing and image restoration processing performed by an image processor 104 in an image pickup apparatus that is a fifth embodiment (Embodiment 5) of the present invention. A configuration of the image pickup apparatus of this embodiment is same as that of the image pickup apparatus of Embodiment 1, and components common to those in Embodiment 1 are denoted by the same reference numerals as those in Embodiment 1.

At steps S11 to S13, the image processor 104 performs same processes as those at steps S11 to S13 in Embodiment 1.

At step S51, the image processor 104 converts the R, G and B images obtained by conversion of the input image at step S13 into images in $YC_RC_B$ space.

At step S52, the image processor 104 produces a blur correction filter that is commonly used for both the out-of-focus area and the in-focus area and is optimized for the in-focus distance in the $YC_RC_B$ space. Then, at step S53, the image processor 104 applies the blur correction filter produced at step S52 to the images in the $YC_RC_B$ space to perform the image restoration processing. Since the image restoration processing is performed in the $YC_RC_B$ space, not in the RGB space, the emphasis of the color blur generated in the RGB space is reduced but remains.

At step S52 described above, the image processor 104 produces chromatic aberration correction filters for the out-of-focus area by using the information on the chromatic aberration, and the information on the in-focus distance and the information on the object distances that have been acquired at step S12. Then, at step S54, the image processor 104 corrects the chromatic aberration correction filters by using the blur correction filter.

At step S55, the image processor 104 applies the corrected chromatic aberration correction filters to the images after the image restoration processing performed at step S53 to perform the chromatic aberration correction processing. Then, at step S56, the image processor 104 again converts the images in the $YC_RC_B$ space after the chromatic aberration correction processing into images in the RGB space. Thus, at step S17, the image processor 104 produces a corrected image in which the color blur in the out-of-focus area has been reduced as in Embodiment 1.

In Embodiments 4 and 5, the color spaces into which the R, G and B images are converted may be color spaces other than the $YC_RC_B$ space.

Although each embodiment described the image pickup apparatus using the image processing method (or including the image processing apparatus), alternative embodiments of the present invention include an image processing computer program which is to be installed into a personal computer to cause the personal computer to perform the chromatic aberration correction processing and the image restoration processing described in each embodiment. In this case, the personal computer corresponds to the image processing apparatus. The personal computer acquires an image (input image) before the image restoration processing produced by an image pickup apparatus, performs the chromatic aberration correction processing and the image restoration processing according to the image processing computer program, and then outputs a resulting image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-079989, filed on Mar. 31, 2010, which is hereby incorporated by reference herein in its entirety.

What is claimed is:

1. An image processing apparatus configured to perform image processing on an input color image produced by image pickup of a scene through an optical system, the scene including plural objects whose distances from the optical system are mutually different, the apparatus comprising:
   a conversion part configured to convert the input color image into at least a first color image and a second color image;
   a filter acquisition part configured to acquire a first chromatic aberration correction filter applied to the first color image and a second chromatic aberration correction filter applied to the second color image for reducing a chromatic aberration component included in an out-of-focus area in the input color image and an image restoration filter for reducing a blur component included in the input color image; and
   a processing part configured to perform chromatic aberration correction processing using the first and second chromatic aberration correction filters and image restoration processing using the image restoration filter on the first and second color images,
   wherein the filter acquisition part acquires the first and second chromatic aberration correction filters by using information on chromatic aberration of the optical system, information on an in-focus distance of the optical system in the image pickup of the scene, and information on the distance to an object included in the out-of-focus area, and
   wherein the processing part outputs a corrected color image by combining the first and second color images on which the chromatic aberration correction processing and the image restoration processing have been performed.

2. An image processing apparatus according to claim 1, wherein the processing part configured to perform the chromatic aberration correction processing in a color space different from that constituting the first and second color images.

3. An image processing apparatus according to claim 1, further comprising:
   a distance measuring sensor configured to measure the object distances to the plural objects,
   wherein the filter acquisition part acquires the first and second chromatic aberration correction filters by using information on the distance to an object included in the out-of-focus area measured by the distance measuring sensor.

4. An image processing apparatus according to claim 1, wherein the first chromatic aberration correction filter and the second chromatic aberration correction filter are mutually different.

5. An image processing apparatus according to claim 1, wherein the chromatic aberration correction processing is performed for an image on which the blur component has been reduced by the image restoration processing.

6. An image processing apparatus according to claim 1, wherein the image restoration filter is applied in common between the first and second color images.

7. An image processing apparatus according to claim 1, further comprising a detector configured to detect an area where the plural objects exist, wherein the filter acquisition part acquires the information on the chromatic aberration of the optical system corresponding to the area detected by the detector.

8. An image processing apparatus according to claim 1, wherein the chromatic aberration correction processing is performed to color images other than one having a highest modulation transfer function among color images converted from the input color image by the conversion part.

9. An image pickup apparatus comprising:
an image pickup system configured to perform image pickup through an optical system; and
an image processing apparatus configured to perform image processing on an input color image produced by image pickup of a scene including plural objects whose distances from the optical system are mutually different,
wherein the image processing apparatus comprises:
a conversion part configured to convert the input color image into at least a first color image and a second color image;
a filter acquisition part configured to acquire a first chromatic aberration correction filter applied to the first color image and a second chromatic aberration correction filter applied to the second color image for reducing a chromatic aberration component included in an out-of-focus area in the input color image and an image restoration filter for reducing a blur component included in the input color image; and
a processing part configured to perform chromatic aberration correction processing using the first and second chromatic aberration correction filters and image restoration processing using the image restoration filter on the first and second color images,
wherein the filter acquisition part acquires the first and second chromatic aberration correction filters by using information on chromatic aberration of the optical system, information on an in-focus distance of the optical system in the image pickup of the scene, and information on the distance to an object included in the out-of-focus area, and
wherein the processing part outputs a corrected color image by combining the first and second color images on which the chromatic aberration correction processing and the image restoration processing have been performed.

10. An image pickup apparatus according to claim 9, further comprising:
a distance measuring sensor configured to measure the object distances to the plural objects,
wherein the filter acquisition part acquires the first and second chromatic aberration correction filters by using information on the distance to an object included in the out-of-focus area measured by the distance measuring sensor.

11. An image pickup apparatus according to claim 9, wherein the first chromatic aberration correction filter and the second chromatic aberration correction filter are mutually different.

12. An image pickup apparatus according to claim 9, wherein the chromatic aberration correction processing is performed for an image on which the blur component has been reduced by the image restoration processing.

13. An image pickup apparatus according to claim 9, wherein the image restoration filter is applied in common between the first and second color images.

14. An image pickup apparatus according to claim 9, further comprising a detector configured to detect an area where the plural objects exist,
wherein the filter acquisition part acquires the information on the chromatic aberration of the optical system corresponding to the area detected by the detector.

15. An image pickup apparatus according to claim 9, wherein the chromatic aberration correction processing is performed to color images other than one having a highest modulation transfer function among color images converted from the input color image by the conversion part.

16. A non-transitory computer-readable storage medium that stores a program that, when executed by a computer, causes the computer to perform an image processing method, the method comprising:
a step of acquiring an input color image produced by image pickup of a scene through an optical system, the scene including plural objects whose distances from the optical system are mutually different;
a conversion step of converting the input color image into at least a first color image and a second color image;
a filter acquisition step of acquiring a first chromatic aberration correction filter applied to the first color image and a second chromatic aberration correction filter applied to the second color image for reducing a chromatic aberration component included in an out-of-focus area in the input color image and an image restoration filter for reducing a blur component included in the input color image; and
a processing step of performing chromatic aberration correction processing using the first and second chromatic aberration correction filters and image restoration processing using the image restoration filter on the first and second color images,
wherein, in the filter acquisition step, the first and second chromatic aberration correction filters are acquired by using information on chromatic aberration of the optical system, information on an in-focus distance of the optical system in the image pickup of the scene, and information on the distance to an object included in the out-of-focus area, and
wherein, in the processing step, a corrected color image is output by combining the first and second color images on which the chromatic aberration correction processing and the image restoration processing have been performed.

17. A non-transitory computer-readable storage medium according to claim 16, the method further comprising:
a distance measuring step to measure the object distances to the plural objects,
wherein the filter acquisition step acquires the first and second chromatic aberration correction filters by using information on the distance to an object included in the out-of-focus area measured by the distance measuring sensor.

18. A non-transitory computer-readable storage medium according to claim 16, wherein the first chromatic aberration correction filter and the second chromatic aberration correction filter are mutually different.

19. A non-transitory computer-readable storage medium according to claim 16, wherein the chromatic aberration correction processing is performed for an image on which the blur component has been reduced by the image restoration processing.

20. A non-transitory computer-readable storage medium according to claim 16, wherein the image restoration filter is applied in common between the first and second color images.

21. A non-transitory computer-readable storage medium according to claim 16, the method further comprising a detection step of detecting an area where the plural objects exist,
wherein the filter acquisition step acquires the information on the chromatic aberration of the optical system corresponding to the area detected by the detection step.

22. A non-transitory computer-readable storage medium according to claim 16, wherein the chromatic aberration correction processing is performed to color images other than one having a highest modulation transfer function among color images converted from the input color image by the conversion step.

* * * * *